Jan. 11, 1944. L. S. WOOD 2,339,039
DROP FRAME BODY HOIST
Filed Feb. 27, 1941
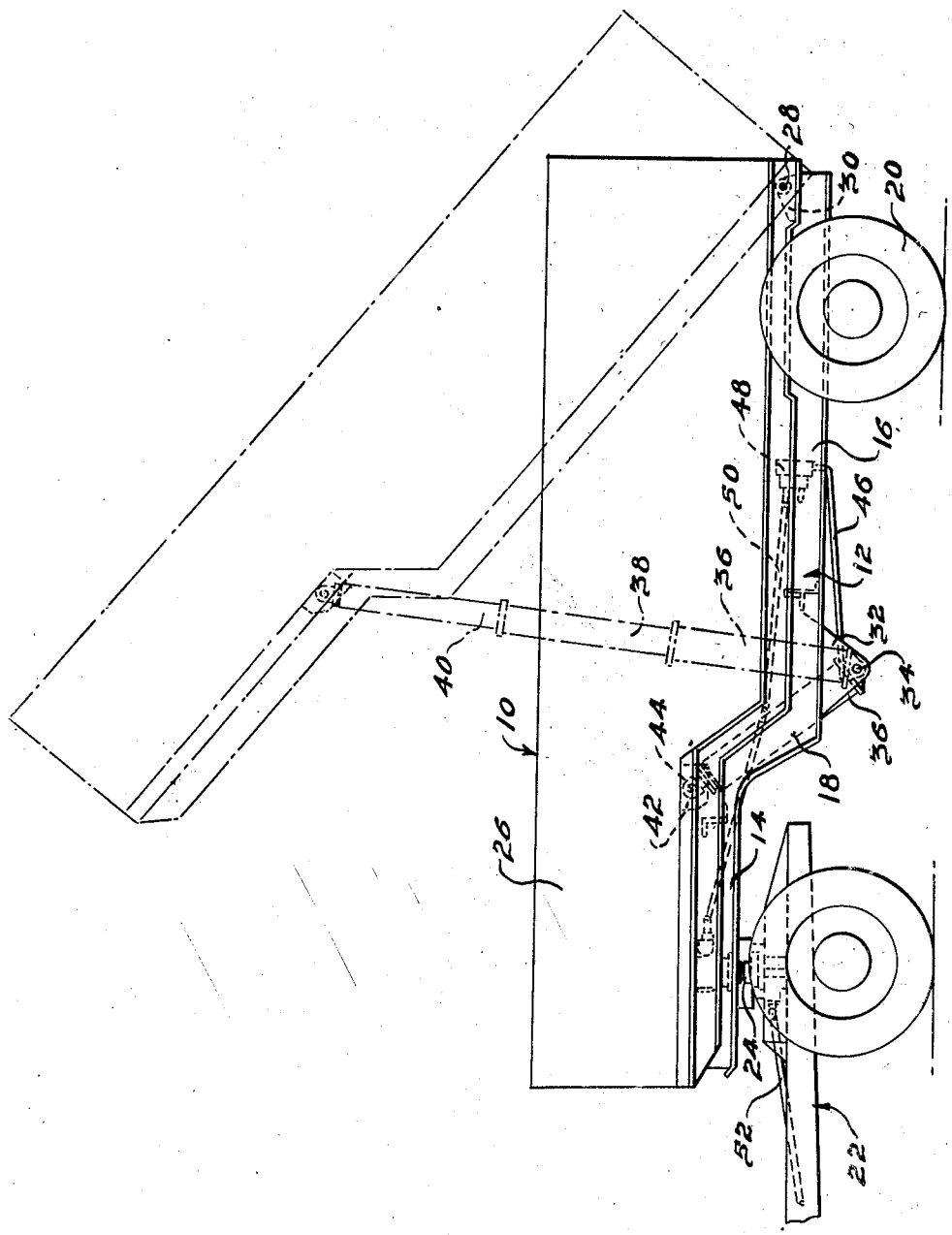
INVENTOR
Louis S. Wood
BY
Harness, Dickey & Pierce
ATTORNEYS.

Patented Jan. 11, 1944

2,339,039

UNITED STATES PATENT OFFICE 2,339,039

DROP FRAME BODY HOIST

Louis S. Wood, Grosse Pointe Farms, Mich., assignor to Gar Wood Industries, Inc., Detroit, Mich., a corporation of Michigan Application February 27, 1941, Serial No. 380,883

2 Claims. (Cl. 298—22)

The present invention relates to dump bodies and particularly relates to dump bodies mounted on drop frame semi-trailers.

One of the primary objects of the present invention is to provide an improved hoist arrangement in drop frame vehicles without loss of pay load in the body and with the advantage of being able to obtain a high lift.

A further object of the invention is to provide a vehicle dump body of the type mentioned having a hoisting mechanism so associated therewith that it may be conveniently and economically mounted on conventional drop frame chassis with a minimum of alterations thereto.

Other objects of the invention will become apparent from the following specification, the drawing relating thereto, and from the claims hereinafter set forth.

The figure is a fragmentary, side elevational view of a drop frame semi-trailer embodying features of the present invention.

Referring to the drawing, a drop frame type of semi-trailer vehicle is generally indicated at 10 and such vehicle includes a drop frame chassis generally indicated at 12. Such chassis 12 includes a front or forward substantially horizontal portion 14, a rear substantially horizontal portion 16, and an intermediate portion 18. The horizontal portion 16 is at a lower level than the horizontal portion 14, so that the intermediate portion 18 slopes downwardly and rearwardly between the front and rear horizontal portions. The usual ground engaging wheels 20 are connected to the chassis 12 adjacent the rear end thereof in the usual way The chassis 12 is pivotally connected to the rear end of an automotive tractor generally indicated at 22. Only the rear end of such tractor is shown, but it will be understood that it is of conventional construction with the cab and engine mounted adjacent the forward end thereof. The connection between the forward end of the chassis with the tractor is through a conventional fifth wheel construction indicated at 24.

A dump body 26 is tiltably supported on the chassis by means of pivots 28 which are located adjacent the rear end of the body and chassis. The dump body 26 may include the usual longitudinal and transverse frame members which support a receptacle formed of the usual side walls, front wall, floor, and pivoted rear gate. The pivots 28 may be suitably secured to upstanding supporting brackets 30 mounted on the chassis which cooperate with the complementary brackets secured to the body for the reception of the pivot pins 28 to pivotally mount the body with respect to the chassis.

Transversely spaced, depending bracket plates 32 are suitably fixed to the under side of the chassis frame 12 adjacent the juncture of the sloping portion with the rear horizontal portion 16, so that such plates depend below the rear portion of the chassis 12. Such plates 32 serve as a mounting means for a pivot pin 34 to which the lower end of an hydraulic cylinder 36 is pivotally connected.

The hydraulic hoisting means for tilting the body include the hydraulic cylinder 36 and may be in the form of a telescoping hoist having telescoping piston sections on the extensible sections 38 and 40. The section 40 is pivotally connected to depending brackets 42 by means of a pivot pin 44. Such depending brackets 42 are secured to the under side of the body adjacent and slightly above the juncture of the horizontal portion 14 with the intermediate portion 18 of the chassis 12. It will thus be seen that the hoisting mechanism, including the cylinder 36 and the nested piston elements, extends substantially parallel to the intermediate portion 18, under the complementary sloping portion of the body when the body is in its normal or horizontal position as shown in the drawing. By so locating the hoisting mechanism, none of the pay load capacity of the body 26 is lost and at the same time hoisting advantages are obtained.

Such hoisting advantages result from the fact that the power stroke of the piston elements is directed forwardly of the dump vehicle and forwardly of the point of pivotal connection between the dump body and the chassis. As the dump body is tilted about its pivot point, the length of extension of the piston elements for a given height of lift is comparatively short. Also, the construction provides a relatively long lever arm about the pivot point 28 during the initial stages of the lift when the load on the hoisting means is greatest.

Also, the hoisting means is located within a space which is normally useless so that no pay space is lost and the structure may be conveniently mounted with a minimum of alterations to conventional drop frame chassis.

The type of hydraulic hoist, including the cylinder 36 and the extensible piston elements 38 and 40, is conventional per se and the fluid under pressure may be supplied thereto through a suitable conduit 46 having its inlet in the lower end of the cylinder 36 and connected in the usual way to a pump 48 mounted on the chassis 12, The pump 48 is connected by a suitable, flexible driving connection 50 through the fifth wheel mechanism 24 to another flexible drive 52. The drive 52 may be connected to a suitable power take-off means on the engine having a suitable control associated therewith. Such drive means through the fifth wheel connection is conventional per se.

By driving the pump 48, the telescoping piston sections 38 and 40 may be extended so that the dump body 26 is raised from the position shown in full lines to that shown in broken lines.

As stated, the force applied by the hydraulic means is forwardly of the vehicle, or away from the pivot point 28, during the initial stages of the lifting or tilting which are the most important stages because the load is greatest at this time. The point of pivotal connection 34 is disposed between the points of pivotal connection 28 and 44 so that the length of extension of the telescoping piston sections 38 and 40 is less than would be the case if the point of pivotal connection 34 were located either immediately under the point 44 or disposed forwardly thereof. Thus, these hoisting advantages are obtained and at the same time the maximum pay load may be carried.

In the embodiment described above, only one cylinder is illustrated as comprising the lifting means for the body, but it is understood that a plurality of such hoisting means may be used if desired. When only one cylinder is used, it is located at the driven center of the body; while, if two cylinders are used, they are located at opposite side of the body but are still located at the same longitudinal position as that described above.

If desired, the hydraulic hoisting means may be of the type disclosed and claimed in the copending application of Edward R. Barrett, Serial No. 284,521, filed July 14, 1939, and assigned to the assignee of the present invention. Also a conventional cylinder and piston type hydraulic jack may be used with the present invention in which such jack has a piston rod extending through the cap end of the cylinder which would be pivotally connected to the body at the pivot point 44.

Formal changes may be made in the specific embodiment of the invention without departing from the spirit of the invention, the scope of which is commensurate with the appended claims.

What is claimed is:

1. A vehicle dump body construction comprising, in combination, a semi-trailer chassis frame having front and rear substantially horizontal portions interconnected by an intermediate portion which slopes downwardly and rearwardly toward said rear portion, a dump body disposed on said chassis, said body being substantially coextensive with said chassis frame and having a bottom complementary in shape to the shape of said frame, means pivotally connecting said body to said chassis adjacent the rear end thereof, means for tilting said body about said pivot connection, said last named means including an hydraulic cylinder and an extensible element associated with said cylinder disposed adjacent said intermediate portion, means pivotally connecting said cylinder to the rear portion adjacent the front thereof, and means pivotally connecting said extensible element to said body adjacent the rear of said front horizontal portion.

2. A vehicle dump body construction comprising, in combination, a semi-trailer chassis frame having front and rear substantially horizontal portions interconnected by an intermediate portion which slopes downwardly and rearwardly toward said rear portion, a dump body disposed on said chassis, said body being substantially coextensive with said chassis frame and having a bottom complementary in shape to the shape of said frame, means pivotally connecting said body to said chassis adjacent the rear end thereof, means for tilting said body about said pivot connection, said last named means including an hydraulic cylinder and an extensible element associated with said cylinder disposed adjacent said intermediate portion and being arranged to lie substantially parallel to said intermediate portion when said body is in its normal horizontal position, a bracket connected to said chassis adjacent the point of juncture of said intermediate portion with said rear portion and depending therebelow, means pivotally connecting the lower end of said cylinder to said bracket, and means pivotally connecting the upper end of said extensible element to said body adjacent the juncture of said front horizontal portion with said intermediate portion.

LOUIS S. WOOD.